3,099,572
METHOD OF TREATING POLYETHYLENE
TO PROMOTE GLUING
James H. Rion, Richard W. Turnage, and Baynard R. Whaley, Hartsville, S.C., assignors to Sonoco Products Company, Hartsville, S.C., a corporation of South Carolina
No Drawing. Filed Nov. 2, 1960, Ser. No. 66,700
9 Claims. (Cl. 117—47)

This invention relates to a method of treating polyethylene and more particularly to such a method for treating the surface of polyethylene to promote gluing of the polyethylene to paper and other materials with the use of commonly known adhesives.

A simplified flow diagram of the method is as follows:

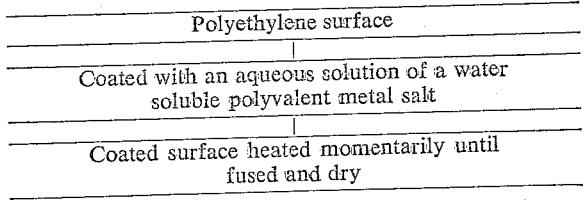

The widespread use of polyethylene in many forms, such as films, plastic articles and the like, has brought about the need for cementing the surface of the polyethylene to a wide variety of materials. However, as is well known, because of the waxy paraffin-like surface properties and other properties of polyethylene, the untreated polyethylene cannot be satisfactorily cemented to other materials with commonly employed adhesives. Generally, polyethylene, which is untreated, can be heat sealed to itself and a few other materials, but in general the only suitable adhesive which can be used with polyethylene is the permanently tacky, non-hardening type of adhesive which does not provide a strong bond and has a tendency to creep or cold flow.

Many processes have been proposed in the past for treating the surface of polyethylene in order to increase its ability to bond to other materials using ordinary adhesives, all of which are noticeably lacking in some respect. In one well known process for improving glueability, a polyethylene surface is exposed to the simultaneous action of ultraviolet radiation and chlorine gas to increase its affinity for certain adhesives. However, this process is quite expensive and produces a variable surface which is unsatisfactory. The chromic acid treatment for polyethylene has also been employed, but the adhesive properties are low and the use of chromic acid is costly and dangerous.

Another well known process for treating a polyethylene surface for increasing its receptivity to adhesives involves the impingement of a flame on the polyethylene surface for a short time without raising the surface of the plastic to a temperature enabling distortion. Such a flame treatment does impart to the polyethylene surface an increase in its affinity for adhesives which is permanent, but falls short of producing the degree of adhesion required in cementing polyethylene to other materials. Generally, this process is suitable for improving the ink receptivity of polyethylene where a low order of adhesion is acceptable.

The above mentioned methods and other methods as well have not been effective to the desired degree for producing adherability of the polyethylene to other materials and generally involve other disadvantages such as undesirable changes in the material treated, complex equipment or excessive cost.

Accordingly, a primary object of this invention is to provide a new and novel process for treating a polyethylene surface so that it may be strongly bonded to paper and other materials with ordinary adhesives.

Another object of this invention is to provide a new and novel process for treating polyethylene surfaces which permits the use of commonly employed adhesives other than the permanently tacky non-hardening type for bonding the polyethylene surface to paper and other materials with a resulting bond having a degree of adherence not heretofore obtainable with such commonly employed adhesives.

This invention further contemplates the provision of a new and novel process for treating a polyethylene surface to increase its affinity for ordinary adhesives which comprises a minimum of steps, utilizes relatively inexpensive materials, is simple in operation and which is highly flexible to permit its use on a variety of polyethylene shapes such as film, molded articles and the like.

Other objects and advantages of the invention will become apparent from the following description.

In general, the objects of the invention and related objects are accomplished by coating the polyethylene surface with a metal salt. To obtain a uniform coating of the metal salt on the polyethylene surface, the metal salt is preferably applied in the form of an aqueous solution. The coated polyethylene surface is then subjected to heat momentarily so that the coated polyethylene surface is dried by the flame. The polyethylene is softened and the metal salt reacts with the polyethylene forming the surface. A gas flame or the like may be used for applying heat to the coated polyethylene surface. The treated polyethylene surface may be readily glued to other materials such as paper or the like with the use of commonly known adhesives of the hardening type such as water soluble adhesives and the bond obtained is extremely strong as the treated polyethylene surface exhibits an affinity for such adhesives totally different from that of an untreated polyethylene surface.

The novel features which are believed to be characteristic of the invention are set forth with particularity in the appended claims. The invention itself, however, both as to its organization and method of operation may be best understood by reference to the description which follows.

As specifically illustrative of the invention, the surface of a polyethylene article such as sheet material, shaped bodies or the like, is first coated uniformly in the area to be glued with a compound which, in general, can be described as a metal salt. The metal salts which have been employed successfully in the practice of the invention are chromic acetate, chromic nitrate, stannous chloride, stannous sulphate, zirconium oxychloride, ferrous chloride, vanadium chloride, titanium trichloride, and potassium permanganate.

In order that a uniform coating of the metal salt employed be obtained on the surface of the polyethylene article, the metal salt is employed in the form of an aqueous solution. As a result of the use of an aqueous solution, the metal salt can be applied uniformly or evenly onto the surface by any suitable means such as spraying, dipping or the like. It has been found that a coating sufficient to cover the surface to be glued produces the desired results of the invention and therefore thick coatings are not necessary with the result that very little coating material is required.

After the polyethylene surface has been coated with the metal salt solution, the coated surface is then dried by the application of heat. The heating of the coated surface is only momentary or for a relatively short time such as by briefly passing a flame over the coated surface so that the polyethylene surface is not raised to a temperature wherein the surface will distort or undergo other undesirable changes. The heat may be applied by means such as a hot air blower, infra red lamp, gas flame or the like. Preferably, a gas flame is employed which impinges momentarily on the coated polyethylene surface preferably for a sufficient length of time to permit the coating to dry. It is contemplated that such a flame can be applied for a maximum of two or three seconds, which time would be determined in accordance with the conditions and materials used.

Polyethylene surfaces treated in accordance with the invention exhibit unusually high bonding characteristics with the use of conventionally known adhesives of the hardening type. Adhesives of the hardening type which can be used with outstanding results are adhesives such as the water soluble silicates, polyvinyl acetate emulsions, and polyvinyl acetate-polyvinyl alcohol mixtures. It should be understood that these adhesives represent examples of a broad class of hardening type adhesives as opposed to non-hardening permanently tacky adhesives.

As a result of the novel polyethylene surface treatment of the invention, the treated polyethylene surfaces may be readily glued to other materials such as paper with a bond having a strength of a high order not heretofore obtainable with other presently used processes for treating polyethylene surfaces for glueability. By way of example of the strength of such a bond, a polyethylene surface treated in accordance with the invention was glued with a conventional adhesive of the hardening type to paper and when an attempt was made to peel the paper from the polyethylene surface, the paper failed rather than the adhesive. Not only is a bond of great strength obtained by the practice of the invention, but the process of the invention is simple to perform, can be accurately controlled and utilizes readily obtainable inexpensive materials. The process of the invention is also suitable for improving the printability of polyethylene surfaces.

The bonding results obtainable with commonly employed adhesives of the type discussed above which are used on polyethylene surfaces treated in accordance with the invention are believed to result in a change in the characteristic of the polyethylene surface after treatment. It is thought that after polyethylene has been formed into the desired article, its surface is characterized by minute particles of unpolymerized or partially polymerized material. The coating of this polyethylene surface with the metal salt in combination with the heating of the coated surface with a gas flame or the like is thought to effect a further polymerizing of these unpolymerized or partially polymerized particles with the metal salt acting as a catalyst. The metal salt appears to fuse or chemically unite with the polyethylene surface after heating. The novel process of the invention is therefore thought to produce a polyethylene surface composed only of polymerized material which appears to bring about the new and unexpected high degree of glueability of the treated surface when using commonly employed adhesives to glue the polyethylene to other materials.

Although it has been found most expedient to employ the metal salts above in an aqueous solution to aid in producing a uniform coating on the polyethylene surface, it is possible to dispense with the aqueous solution of the metal salt and use the metal salt in the form of a powder or the like. The powder may be sprinkled as a substantially uniform coating on the polyethylene surface to be treated and the same novel results accomplished by this invention will be obtained. However, the use of an aqueous solution is thought to simplify the practice of the invention.

The new and unexpected results of the invention are obtained with the use of the specific metal salts listed above, all of which appear to have certain common characteristics. The metal salts are all water soluble and are polyvalent. Furthermore, in the periodic table the elements of which they are composed fall within groups 4 through 6 and periods 4 through 6.

While there has been described what at present is considered to be the preferred embodiment of the invention, it will be understood by those skilled in the art that various changes and modifications may be made therein without departing from the invention and, therefore, it is the aim of the appended claims to cover all such changes and modifications as fall within the true spirit and scope of the invention.

Having thus described the invention what is claimed is:

1. A method of treating a polyethylene surface comprising the steps of, coating the surface to be treated with an aqueous solution of chromic acetate and momentarily applying heat to said coated surface to dry said surface, to soften the polyethylene in said surface and react the chromic acetate with the polyethylene whereby the treated surface may be strongly bonded to other materials with commonly employed adhesives of the hardening type.

2. A method of treating a polyethylene surface comprising the steps of, coating the surface to be treated with an aqueous solution of chromic nitrate and momentarily applying heat to said coated surface to dry said surface, to soften the polyethylene in said surface and react the chromic nitrate with the polyethylene whereby the treated surface may be strongly bonded to other materials with commonly employed adhesives of the hardening type.

3. A method of treating a polyethylene surface comprising the steps of, coating the surface to be treated with an aqueous solution of stannous chloride and momentarily applying heat to said coated surface to dry said surface, to soften the polyethylene in said surface and react the stannous chloride with the polyethylene whereby the treated surface may be strongly bonded to other materials with commonly employed adhesives of the hardening type.

4. A method of treating a polyethylene surface comprising the steps of, coating the surface to be treated with an aqueous solution of stannous sulphate and momentarily applying heat to said coated surface to dry said surface, to soften the polyethylene in said surface and react the stannous sulphate with the polyethylene whereby the treated surface may be strongly bonded to other materials with commonly employed adhesives of the hardening type.

5. A method of treating a polyethylene surface comprising the steps of, coating the surface to be treated with an aqueous solution of zirconium oxychloride and momentarily applying heat to said coated surface to dry said surface, to soften the polyethylene in said surface and react the zirconium oxychloride with the polyethylene whereby the treated surface may be strongly bonded to other materials with commonly employed adhesives of the hardening type.

6. A method of treating a polyethylene surface comprising the steps of, coating the surface to be treated with an aqueous solution of ferrous chloride and momentarily applying heat to said coated surface to dry said surface, to soften the polyethylene in said surface and react the ferrous chloride with the polyethylene whereby the treated surface may be strongly bonded to other materials with commonly employed adhesives of the hardening type.

7. A method of treating a polyethylene surface comprising the steps of, coating the surface to be treated with an aqueous solution of vanadium chloride and momentarily applying heat to said coated surface to dry said surface, to soften the polyethylene in said surface and react the vanadium chloride with the polyethylene whereby the treated surface may be strongly bonded to other materials with commonly employed adhesives of the hardening type.

8. A method of treating a polyethylene surface comprising the steps of, coating the surface to be treated with an aqueous solution of titanium trichloride and momentarily applying heat to said coated surface to dry said surface, to soften the polyethylene in said surface and react the titanium trichloride with the polyethylene whereby the treated surface may be strongly bonded to other materials with commonly employed adhesives of the hardening type.

9. A method of treating a polyethylene surface comprising the steps of, coating the surface to be treated with an aqueous solution of potassium permanganate and momentarily applying heat to said coated surface to dry said surface, to soften the polyethylene in said surface and react the potassium permanganate with the polyethylene whereby the treated surface may be strongly bonded to other materials with commonly employed adhesives of the hardening type.

References Cited in the file of this patent

UNITED STATES PATENTS

| | | |
|---|---|---|
| 2,464,143 | Martinson et al. | Mar. 8, 1949 |
| 2,668,134 | Horton | Feb. 2, 1954 |
| 2,676,120 | Banigan | Apr. 20, 1954 |
| 2,764,502 | Emerson | Sept. 25, 1956 |
| 2,898,229 | Herr et al. | Aug. 4, 1959 |
| 2,955,958 | Brown | Oct. 11, 1960 |